(12) United States Patent
Hand et al.

(10) Patent No.: US 7,111,304 B2
(45) Date of Patent: Sep. 19, 2006

(54) METHOD, SYSTEM, AND PROGRAM FOR ACCESSING INFORMATION FROM DEVICES

(75) Inventors: Steven G. Hand, Westminster, CO (US); Arieh Markel, Lafayette, CO (US); Deborah Peterson, Lafayette, CO (US); Kristina A. Tripp, Denver, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 778 days.

(21) Appl. No.: 10/153,484

(22) Filed: May 21, 2002

(65) Prior Publication Data

US 2003/0220892 A1    Nov. 27, 2003

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/315; 719/321; 710/15
(58) Field of Classification Search ............ 710/15–19, 710/62–64, 72–74; 709/220–224; 719/310, 719/321, 313–315
See application file for complete search history.

(56) References Cited

U.S. PATENT DOCUMENTS 6,862,736 B1*   3/2005   Hudis et al. ................. 719/316
2002/0124007 A1*   9/2002   Zhao ........................... 707/102

OTHER PUBLICATIONS

Hughes et al, Say Goodbye to Quirky APIs: Building a WMI Provider to Expose your Object Info, MSDN Magazine, May 2000, pp. 1-15.*

Microsoft, Microsoft Press Computer Dictionary—Third Edition, 1997, p. 66.*

Gamma et al, Design Patterns, Addison-Wesley, 1995, Factory Method section.*

U.S. Appl. No. 10/153,546, filed May 21, 2002, entitled "Method, System and Program for Using Buffers to Provide Property Value Information for a Device," invented by S.G. Hand; A. Markel; D. Peterson and K.A. Tripp.

Schott, Julie. "CIM System/Device Working Group. Modeling Storage." Version 1.00, 19 pages.

Distributed Mangement Task Force, Inc., (DMTF). "Specification, DSP0107. Common Information Model (CIM) Indications (Final Draft)," Version 2.5, Dec. 14, 2000, pp. 1-32 [online] [retrieved on Nov. 1, 2001]. Retrieved from http://www.dmtf.org/.

Distributed Mangement Task Force, Inc., (DMTF). Am, A.N, J. Nguyen and Gadzoox Netowrks. "CIM Provider for Storage Area Network (SAN) Devices." DMTF 2001 Developers' Conference, Jun. 11-13, 2001, pp. 1-30 [online] [retrieved on Nov. 1, 2001]. Retrieved from http://www.dmtf.org.

(Continued)

*Primary Examiner*—William Thomson
*Assistant Examiner*—Diem Cao
(74) *Attorney, Agent, or Firm*—Finnegan, Henderson, Farabow, Garrett & Dunner LLP

(57) ABSTRACT

Provided are a computer implemented method, system, and program for enabling access to information from a device. A device program is generated to access device property information from the device. Each device property indicates a state of the device and the device program includes device specific commands to query the device for information on the device properties and device independent statements common to device programs for other devices to buffer the queried property information to return to requesting clients. The device program is stored in a computer readable medium.

42 Claims, 9 Drawing Sheets

OTHER PUBLICATIONS

Distributed Mangement Task Force, Inc., (DMTF). "CIM FAQs," pp. 1-3 [online] [retrieved on Nov. 1, 2001] Retrieved from http://kdmtf.org/about/faq/cim.php.

Distributed Mangement Task Force, Inc., (DMTF). Specification. Understanding the Application Management Model, Version 1.0, May 17, 1998 [online] [retrieved on Nov. 1, 2001]. Retrieved from http://www.dmtf.org.

Distributed Mangement Task Force, Inc., (DMTF). Common Information Model (CIM) Specification, Version 2.2, Jun. 14, 1999, pp. 1-98 [online] [retrieved on Nov. 1, 2001]. Retrieved from http://www.dmtf.org.

The Open Group. Brasher, M., K. Schopmeyer. "Overview of Pegasus. An Open-Source WBEM Implemention," Version 1.0, Jun. 12, 2001, pp. 1-113 [online] [retrieved on Jan. 18, 2002].

Sun Microsystems, Inc. Java Developer Connection(sm) Tech Tips, Mar. 28, 2000 [online] [retrieved on Jan. 24, 2002] Retrieved from http://www.sunmicrosystems.com.

Sun Microsystems, Inc. "The Java Tutorial . . . Locking an Object," [online] [retrieved on Jan. 24, 2002] Retrieved from http://www.sunmicrosystems.com.

\* cited by examiner

METHOD, SYSTEM, AND PROGRAM FOR ACCESSING INFORMATION FROM DEVICES

BACKGROUND OF THE INVENTION

1. Field of the Invention

The present invention relates to a method, system, and program to provide property value information for a device.

2. Description of the Related Art

The Web-Based Enterprise Management (WBEM) framework is a set of management and Internet standard technologies developed to provide a common set of protocols to enable the management of enterprise computing environments. The WBEM standard includes the Common Information Model (CIM), which provides a conceptual framework for interchanging information between management systems and applications. The CIM schema provides a set of object oriented classes with properties that are used to organize and access the information about the managed environment in a common format. The WBEM/CIM schema allows one to use a web browser to access a CIM compliant server to access information from a device using the CIM framework. One can construct a generalized management application using the CIM framework and components without needing to know or incorporate device specific or proprietary commands of the device being managed.

The elements that may be managed and accessed using the WBEM/CIM framework include systems, applications, networks, and devices (e.g., storage systems, printers, etc). Extension schemas are provided to extend the CIM to technology-specific areas, such as storage devices. To comply with the CIM architecture, a product must implement the CIM core and common schema classes to enable CIM clients to use standard CIM methods to access information about the product. This requires the product vendor to develop product (e.g., application, device, system, etc.) specific code that implements the CIM classes to provide access to the product information.

The CIM model provides a core model that captures notions applicable to all areas of information management. A common model provides access to information common to particular management areas, but independent of a particular technology. Extension schemas represent technology specific implementations of the model that provide access to information specific to a particular product. Vendors must, thus, provide an instance of the model to enable access to the product information and configuration settings as specified in the CIM specification. Further details of the CIM model are described in publications from the Distributed Management Task Force (DMTF), including "Common Information Model (CIM) Specification", Version 2.2, (Jul. 14, 1999) and "Understanding the Application Management Model", Version 1.0 (May 17, 1998), which publications are incorporated herein by reference in their entirety.

The CIM indication schema provides classes used to communicate occurrences of events in the managed environment. An event is typically assumed to be a change in the state of the device environment or a record of the behavior of some component of the environment. Examples of events include the starting or stopping of a service, addition of resources to a monitored device, the occurrence of a pervasive incident, state change requiring immediate attention, such as being low on disk space, etc. The occurrence of an event is represented by an instance of the CIM Indication class. Clients can subscribe to indications caused by changes in the state of CIM objects to receive notification and alerts when certain states or information changes in a managed object. Subscription refers to the classes and methods that clients use to subscribe to and receive indications. Details of the classes of the CIM indication schema are described in the DMTF publication "Common Information Model (CIM) Indications", Version 2.5 (Dec. 14, 2000), which publication is incorporated herein by reference in its entirety.

As with the CIM model, vendors wanting to provide information on their products through the CIM indication schema, must implement the classes specified in the CIM model and CIM indications. This requires each vendor to write device specific code that in response to calls from methods defined in the CIM specification performs device specific operations to provide the requested indications and other information, and provide access to the device as defined in the CIM specification. This process of writing the device specific code to implement the classes of the CIM model and CIM indication is a substantially time consuming and expensive process.

Moreover, when network devices implement the WBEM/CIM framework, they may receive numerous requests for information from applications and browsers requesting information or performing management operations with respect to the managed device. Such devices, as storage systems, etc., are often not designed to function as a web server. Thus, devices that participate in the WBEM/CIM environment may experience a substantial increase in processing burdens due to the need to function as a web server and respond to information requests and control operations from external devices.

For these reasons, there is a need in the art to provide improved techniques to enable vendors to integrate their products into the CIM environment and provide property value information from the devices.

SUMMARY OF THE DESCRIBED IMPLEMENTATIONS

Provided are a computer implemented method, system, and program for accessing information on a plurality of different devices in a network. A device program is instantiated for the devices, wherein each device program includes methods that are common in all device programs for different devices. Methods in a page program are called to access, wherein methods in the page program include device specific commands to query the device for information on device properties, and wherein each property indicates a unit of information on the device. Statements in one device program are executed to query the device for information on device properties and information on device properties received in response to the query is added to at least one page in a computer readable medium. The pages include property information for different devices queried using device specific commands in the device programs.

In further implementations, a request for information on device properties for one target device is received and the page including the requested device properties for the target device is accessed. Information on the requested device properties from the accessed page is retrieved and returned.

Further implementations include a properties class for each device including device specific commands to obtain information needed to access the device over a network. The page program comprises a page class of methods to access information from the device.

In yet further implementations, the different devices may be from different vendors.

Further provided are a method, system, and program for enabling access to information from a device. A device program is generated to access device property information from the device. Each device property indicates a state of the device and the device program includes device specific commands to query the device for information on the device properties and device independent statements common to device programs for other devices to buffer the queried property information to return to requesting clients. The device program is stored in a computer readable medium.

The described implementations provide techniques to access information from different devices using a program architecture that utilizes certain device program methods that are common for device programs for different devices and certain page program commands that are specific to the device.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
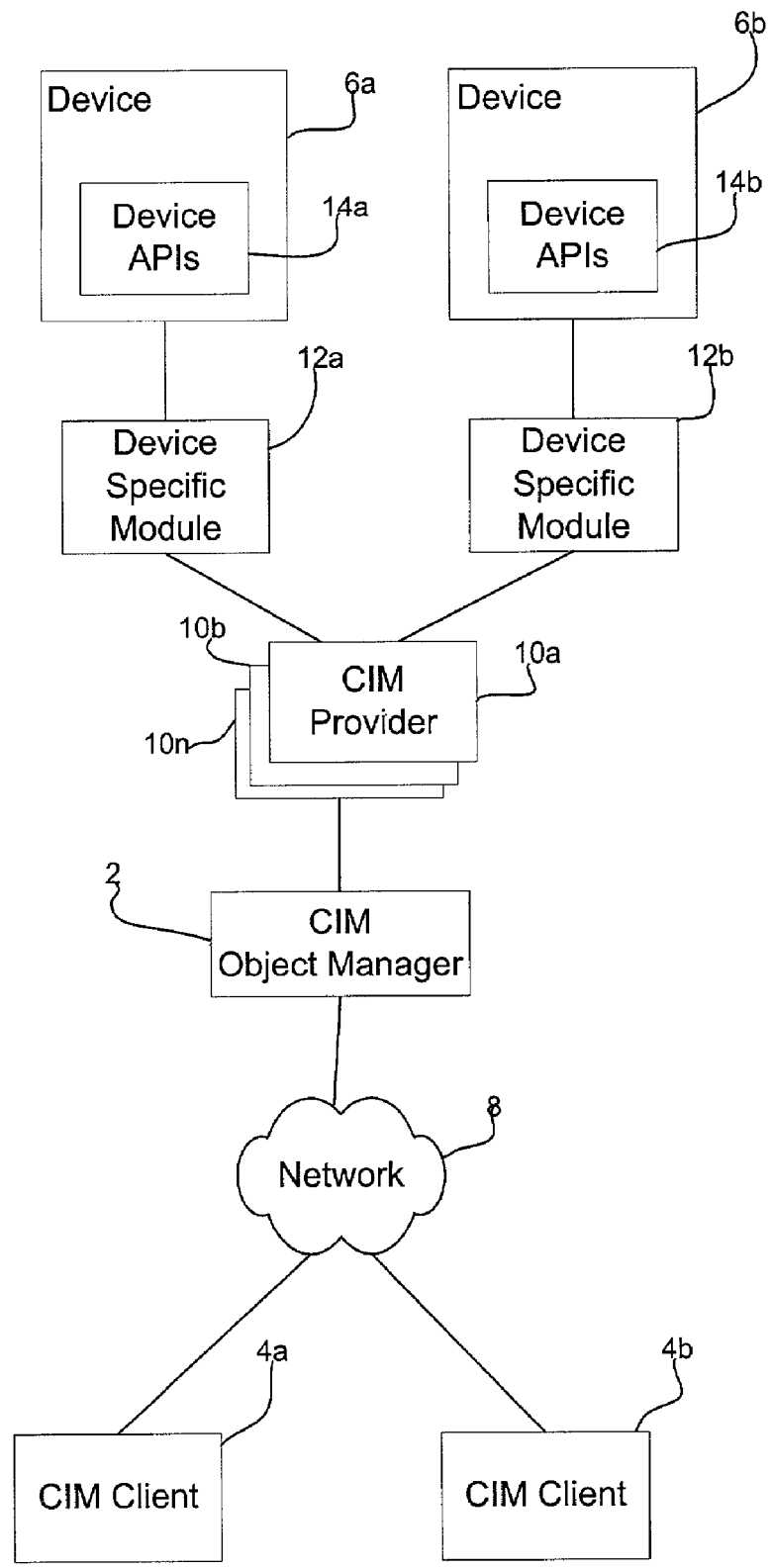
FIG. 1 illustrates computing environment in accordance with implementations of the invention.

FIG. 1 illustrates a WBEM computing environment in which aspects of the invention are implemented. As discussed, the WBEM computing environment provides a framework to model, present for use, and decompose information on devices to management applications that are not aware of the particulars of the managed devices. The WBEM framework provides a consistent interface to management applications across devices. A CIM Object Manager (CIMOM) 2 receives requests from CIM clients 4a and 4b for information on devices 6a and 6b. The CIM clients 4a and 4b may communicate with the CIMOM 2 over a network 8. The CIMOM 2 implements, in a manner known in the art: a transport mechanism (e.g., TCP) and application protocol (e.g., HTTP) to communicate with the CIM clients 4a and 4b, where the clients 4a and 4b may utilize an HTML browser for communication; encoding and decoding of messages (e.g., CIM-XML); dispatching of messages to providers 10a, 10b . . . 10n and/or a CIM repository (not shown); and an aggregation of results from multiple CIM providers 10a, 10b . . . 10n to return in a single response, e.g., single HTML page, to the requesting client 4a, 4b. The CIMOM 2 processes the requests from the clients 4a and 4b and then interfaces with the CIM providers 10a, 10b . . . 10n, where the CIM providers 10a, 10b . . . 10n in turn obtain the requested device specific information or perform the device related operations, and return any obtained information to the CIMOM 2 to return to the CIM clients 4a, 4b.

The CIM providers 10a, 10b . . . 10n provide information about a specific type of device 6a and 6b, where a type of device comprises a specific model of a device, such as a Sun Microsystems' SunStorEdge T3 Array storage array, Sun Enterprise server,** etc. Multiple providers 10a, 10b . . . 10n may be utilized to provide access to different types of information and controls for a device, or to provide information for specific components of a device, e.g., the hard disk drives, controller, network card, etc. within a storage server. In providing access to different types of information or controls, each CIM provider 10a, 10b . . . 10n may implement one of the following CIM provider interfaces in a manner known in the art: an instance provider interface that provides utility methods (create, delete, modify, query, etc.) to support instances of specific CIM classes; a method provider interface that lists methods that a provider supports; a property provider interface that supports retrieval and modification of CIM properties (i.e. get and set methods to modify name/value pair of a CIM instance); and an association provider interface that provides information on the relationship between classes and instances.

**Sun Microsystems, StorEdge, Jini, and Sun Enterprise are trademarks of Sun Microsystems, Inc.

To interface with the devices 6a, 6b, the CIM provider 10a, 10b . . . 10n instantiates instances of classes implemented by device specific modules 12a and 12b and calls methods from such classes to access data from the devices 6a and 6b. In the described implementations, the device specific modules 12a and 12b implement classes, referred to herein as the Device Communication (DevComm) classes, in device specific code that utilize device specific Application Programming Interfaces (APIs) 14a and 14b to access information from the managed resource 6a and 6b.

Although only one device specific module 12a, 12b is shown for each device 6a, 6b, each device may have multiple device specific modules to enable communication with specific components within the device, such that there is a separate device specific module for each logical, software or hardware component with which a CIM provider 10a, 10b . . . 10n may communicate. A separate set of CIM providers 10a, 10b . . . 10n may be provided for each device specific module 12a, 12b. For instance, one CIM provider may be provided to communicate with a device specific module for one disk, controller, network adaptor, backup program, file manager, etc., within a storage server.

The network 8 may comprise any network system known in the art, such as a Local Area Network (LAN), Storage Area Network (SAN), Wide Area Network (WAN), the Internet, an Intranet, etc. The devices 6a and 6b may comprise a software application, such as database program, utility program, operating system, etc., or a hardware device, such as a storage device, printer, network appliance, Internet appliance, or any other device known in the art capable of being electronically queried for information. To access information on the devices 6a and 6b, the CIM clients 4a and 4b would issue information requests conforming to the CIM specification and CIM indication classes to the CIMOM 2. The CIM clients 4a and 4b and CIM providers 10a, 10b . . . 10n may be implemented on different computing devices or execute on the same computing device. The computing device in which the CIM clients 4a, 4b and provider 2 are implemented may comprise any type of computing device known in the art, such as a server, workstation, desktop computer, portable computer, hand held computer, telephony device, etc. In certain implementations, the CIM providers 10a, 10b . . . 10n and CIMOM 2 are implemented on a separate server class computer in order to handle information requests from various CIM clients 4a, 4b over the network 8.

In the described implementations, each vendor of a device 6a and 6b wanting to participate in the CIM architecture would have to write code implementing the device communication (DevComm) classes. The vendors would have to provide code to allow their system to implement the functionality of the device communication (DevComm) classes. The vendors may code device specific APIs 14a, 14b, which include methods having device specific commands to query the devices 6a and 6b for information. In other words, the device specific modules 12a, 12b provide the mapping or translation of the device communication (DevComm) classes and the device specific APIs 14a, 14b.

Figure 2:
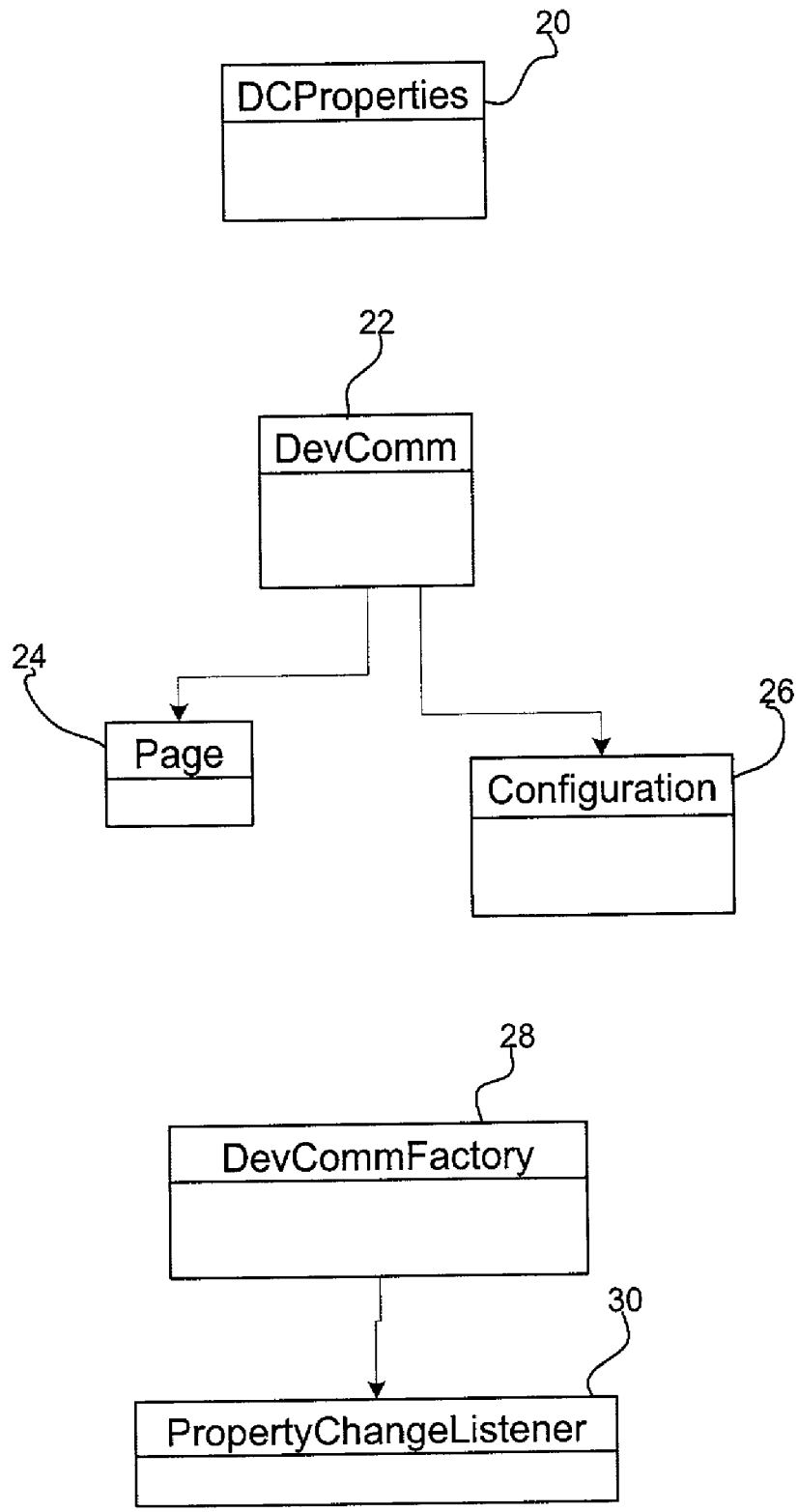
FIG. 2 illustrates a class architecture in accordance with implementations of the invention.

FIG. 2 illustrates the classes that the vendor may support in certain implementations. A DCProperties class 20 enables communication with the device 6a, 6b, a device communication(DevComm) class 22 enables access to information from the devices 6a, 6b. A page class (Page) 24 and configuration class 26 includes methods to buffer information accessed from the devices 6a, 6b and write to the configuration space of the device 6a, 6b, respectively. The page class 24 and configuration class 26 implement device specific commands, the device specific APIs 14a, 14b, to interact directly with the device 6a, 6b. The page 24 and configuration 26 classes may be sublcasses or inherit from the DevComm class 22. A DevComm factory class 28 includes methods to manage the instances of the DevComm classes for the different devices of the system. A propertyChangeListener class 30 is a subclass or inherits from the DevComm class 28 and includes methods to manage a list of users that are registered to receive notification of certain events with respect to device properties maintained in the pages. Each vendor participating in the CIM environment may implement the above described classes to allow users to obtain information on and configure the devices using the methods of the DevComm and other classes, which are the same across vendors.

Figure 3:
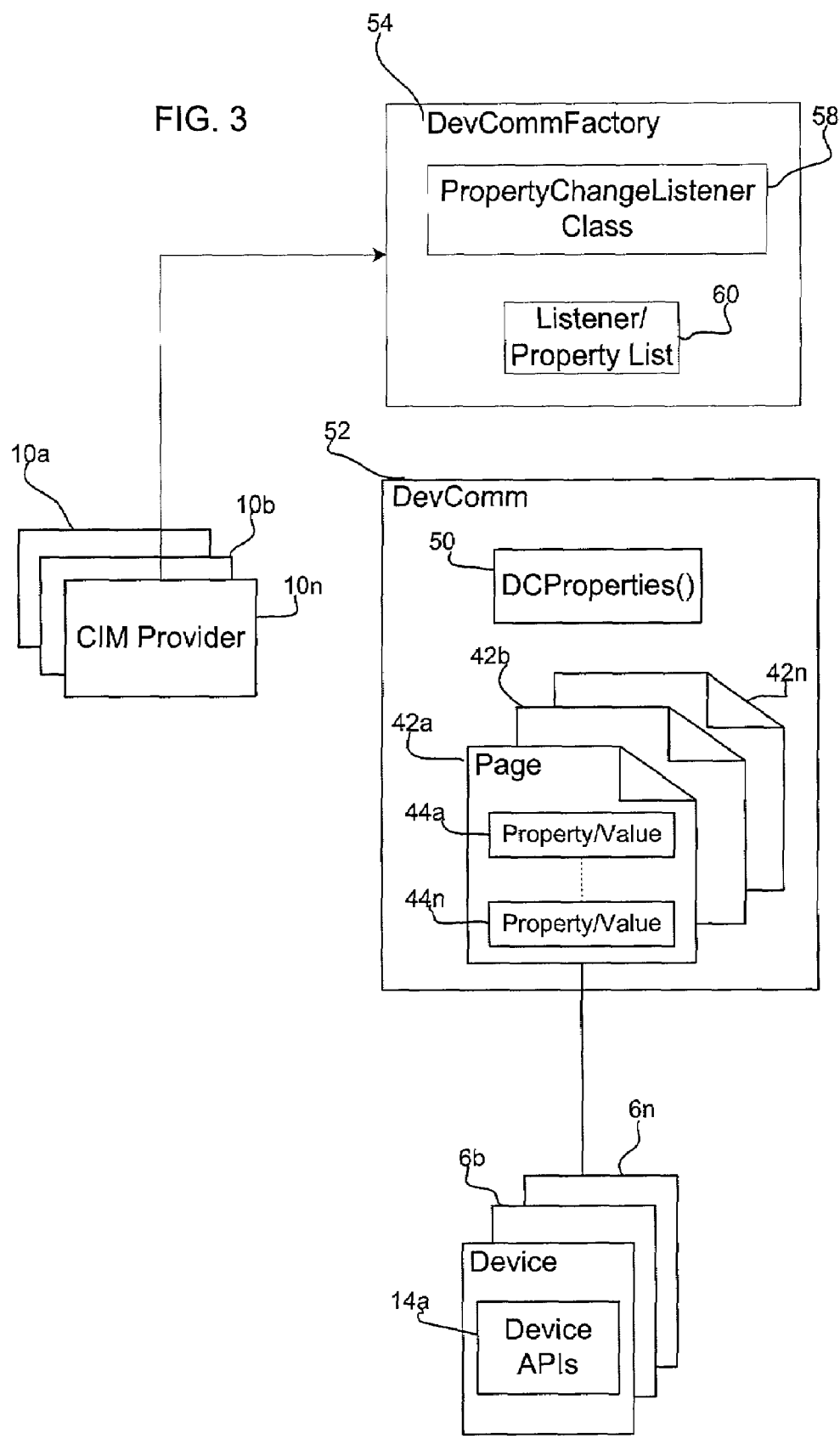
FIG. 3 illustrates a program architecture in accordance with implementations of the invention.

FIG. 3 illustrates a program component architecture to provide access to information from devices 6a, 6b . . . 6n. The CIM provider 10a, 10b . . . 10n receives a request from the CIMOM 2 and then constructs a DC properties 50 instance to provide to a DevComm 52 instance for a particular device 6a, 6b . . . 6n. The CIM provider 10a, 10b . . . 10n would call methods of the device communication properties (DCProperties) class 20 in order to query the DevComm Factory 54. The DevComm Factory 54 would then construct or utilize an already existing DevComm object 52 created for the device. The DevComm Factory 54 further provides the CIM provider 10a, 10b . . . 10n with a handle to the instance of the DevComm class 52 for the target device 6a, 6b . . . 6n.

The DevComm instance 52 calls methods of the page class 26 to create pages 42a, 42b . . . 42n having information on the devices 6a, 6b . . . 6n in an accessible memory or storage device. One or more pages 42a, 42b . . . 42n may be maintained for each device 6a, 6b . . . 6n. Each page 42a, 42b . . . 42n includes a plurality of property/value pairs 44a . . . 44n, where the properties indicate an environmental, operational or other state of the device 6a, 6b . . . 6n and the value provides the particular value for that property determined the last time the device 6a, 6b . . . 6n was queried for information. In certain implementations, the property/value pairs 44a . . . 44n are implemented in a searchable hash table. Further, as shown in FIG. 3, the pages 42a, 42b . . . 42n may be maintained in the instance of the DevComm object 52 for one device 6a, 6b . . . 6n The CIM Provider 10a, 10b . . . 10n would further instantiate a PropertyChangeListener class 58 to include in the DevComm Factory 54. The DevComm factory 54 would call methods of the instantiated PropertyChangeListener class 58 to manage a listener/property list 60, that indicates users that have registered to receive notification of changes to specific property values 44a . . . 44n in one of the pages 42a, 42b . . . 42n. The DevComm Factory 54 notifies the requesting CIM Provider 10a, 10b . . . 10n of changes to properties. The PropertyChangeListener class 30 provides a propertyChange( ) method to detect a change to one property value 44a . . . 44n in one of the pages 42a, 42b . . . 42n. In certain implementations, the methods of the PropertyChangeListener class 58 are used to provide status change information for all instances of a particular device type 6a, 6b, e.g., provides status change information for any device, e.g., storage server, storage array, etc., or component therein. The propertyChange( ) method would thus read all pages 42a, 42b . . . 42n providing information for instances of a particular device to see if the properties for device instances have changed for a device type. If so, the propertyChange( ) method notifies the DevComm( ) instance 52 of each device instance for which a change was detected. Each notified DevComm( ) instance 52 then notifies the DevComm Factory instance 54 about the changes and the DevComm Factory 54 calls the PropertyChangeListener 58 to report the change to the subscribed CIM client 4a, 4b.

As discussed, the DevComm Factory 54, in response to requests from the CIM providers 10a, 10b . . . 10n, instantiates instances of the DevComm class 52 to enable CIM providers 10a, 10b . . . 10n to access information from the devices 6a, 6b . . . 6n. Further, the page 24 and configuration 26 classes include device specific APIs 14a, 14b . . . 14n to obtain information on property values included in the pages 42a, 42b . . . 42n and to perform configuration operations with respect to the device 6a, 6b . . . 6n.

The CIM clients 4a, 4b are aware of CIM providers 10a, 10n . . . 10n for a specific type of device, and the CIM provider 10a, 10b . . . 10n maps the CIM client 4a, 4b requests to the DevComm class instance 52 implemented for a particular instance of a device type, e.g., a particular T3 storage server. As discussed, each CIM provider 10a, 10b . . . 10n provides information and access to configuration settings for all instances of a particular device type, e.g., all accessible T3 storage servers in the system. Each time a CIM Provider 10a, 10b . . . 10n is called for a particular instance of a device, e.g., a particular identified system, a DCProperties class 20 (FIG. 2) is instantiated. DCProperties provides methods that the CIM provider 10a, 10b . . . 10n uses to communicate requests to the DevComm Factory instance 54. The DevComm Factory class 26 provides methods to construct a DevComm( ) instance 52 for a device or component of the device, or returns a handle for an existing device or device component. Thus, one DevComm( ) class instance 52 is provided for each instance of a device or device component to enable communication with that device 6a, 6b or device component. The DevComm( ) class calls methods of the page class 26 to refresh and access device property information in the page data 42a, 42b . . . 42n.

The DCProperties class 20 may implement the following methods. Credentials or authentication may be required to access the methods of the DCProperties or any other class described herein:

getAccessPath( ): includes device specific APIs 14a, 14b . . . 14n to query the device 6a, 6b . . . 6n for the access path to the device 6a, 6b, which may include a port of the device and network address, e.g., IP address.

getDeviceType( ): includes device specific APIs 14a, 14b . . . 14n to query the device 6a, 6b . . . 6n for the device type of the device 6a, 6b. This method may be implemented as an extension of the device properties class.

The DevComm class 22 may implement the following methods:

activate( ): schedules the page 42a, b . . . n refresh operations.

addListener( ): registers a CIM client 4a, 4b in the listener/property list 60 to notify the CIM client 4a, 4b of any change to the specified property value 44a . . . 44n in one of the pages 42a, 42b . . . 42n.

removeListener( ): removes a specified CIM client 4a, 4b from the listener/property list 60 for a specified property value 44a . . . 44n. In certain implementations, the addListener( ) and removeListener( ) methods are used by an Event Provider, which is a type of CIM provider that registers property change listeners for a type of device.

createPages( ): creates specified pages 42a, 42b . . . n.

getPage( ): returns specified pages containing desired property/value pairs 44a . . . 44n.

getProperty( ): includes device specific APIs 14a, 14b . . . 14n to query the device 6a, 6b . . . 6n for values of the current state of one or more specified property values at the device 6a, 6b . . . 6n.

getPropeties: exposes a list of properties maintained in the pages 42a, 42b . . . 42n. Each page has part of the list of properties. For instance, a particular device may have twenty attributes spread across four pages.

getScheduler( ): access to the scheduler program that schedules the refresh operations to the pages 42a, 42b . . . 42n.

getConnectionState( ): determines the state of the connection to a specified device.

setIdleInterval( ): sets a specified period of inactivity before the particular DevComm instance 52 will go inactive. If a request from one of the clients 4a, 4b is not received for the property/value 44a . . . 44n information in a page 42a, 42b . . . 42n or there are no registered listeners for property values on the page, then that DevComm( ) instance 52 is closed, and any future access to the device 6a, 6b . . . 6n requires instantiation of the DevComm( ) instance 52 checkTimeout( ): deactivates the DevComm( ) instance 52 if there are no listeners on the listener/property list 60 and there has been no CIM client 4a, 4b requests during the idle interval propagateEvent( ): propagates information on a property change to listeners registered for the property in the listener/property list 60.

invalidateAllData( ): forces the page to refresh.

In addition, device 6a, 6b . . . 6n vendors may implement extensions to the DevComm class 22 to include such methods as:

alarms( ): returns the state of a device 6a, 6b . . . 6n sensor.

config( ): implements a device 6a, 6b . . . 6n configuration service.

control( ): implements a device 6a, 6b . . . 6n control service to implement a specified setting passed as a parameter with the method to implement a setting on the device 6a, 6b . . . 6n.

send( ): send a request to the device 6a, 6b . . . 6n.

isActive( ): returns whether the current DevComm instance 32a, 32b . . . 32n is active.

The page( ) instances 42, 42b . . . 42n are created with the following parameters that determine how refresh operations are performed:

pageName: the name of the page to be refreshed by the page( ) instance 42a, 42b . . . 42n.

defaultinterval: the default interval at which page refreshes are to occur.

propertyNames: list of properties to refresh at intervals for specified page. Such property names may be device specific and provided by the device 6a, 6b . . . 6n vendor devcomm: a handle to the DevComm( ) instance 54 that created the specified page 42a, 42b . . . 42n.

The page class 24 implements methods to refresh the property/value pairs 44a . . . 44n in the pages 42a, 42b . . . 42n by interacting with the device 6a, 6b . . . 6n, including:

diff( ): compares the pre-refresh property values 44a . . . 44n with the post-refresh property values in a specified page 42a, 42b . . . 42n to determine those property values 44a . . . 44n that have changed.

getProperties( ): returns the list of properties handled by a specified page 42a, 42b . . . 42n.

getProperties( ): returns the value for a specified property. This method is implemented with device specific APIs 14a, 14b . . . 14n that query the device 6a, 6b . . . 6n to access the property values.

refreshInterval( ): determines the refresh interval for a page.

setInterval( ): sets the refresh interval for a specified page 42a, 42b . . . 42n.

getFromDevice( ) return a list of properties from the device calling the API's on the device.

The DevCommFactory class 28 provides the following methods the DevComm Factory 54 invokes to manage DevComm( ) instances 52. The DevComm Factory class 28 may manage DevComm( ) instances 52 for many different devices:

addListener: registers a CIM client 4a, 4b on the listener/property list 48 to receive notification of any changes to a specified property value 44a . . . 44n.

removeListener: removes a CIM client 4a, 4b as registered to receive notifications for a specified property value 44a . . . 44n on the listener/property list 48.

get: for a specified DCProperties( ) instance 50, instantiates a DevComm( ) instance 54 with an IP address, port number, user name and password contained in the DCProperties( ) instance 50. Throws an exception if a connection to the device 6a, 6b . . . 6n cannot be established. However, the parameters of each instance of the DCProperties ( ) 50 are device specific. Thus, the DCProperties( ) 50 instances for different devices may use different parameters.

printFactoryContents( ): provides the names of the DevComm( ) instances 54 instantiated by the CIM provider 10a, 10b . . . 10n using the instance of the DevComm Factory( ).

Most of the above described methods in the DevComm 22 and DevComm Factory 28 classes do not require any device specific code and concern interaction of the CIM processes.

Such device independent methods can be implemented using standard commands that may be used by all vendors, thereby relieving vendors of the need to write code for such device independent methods. With the described implementations, the vendor need only code a limited number of device specific methods to participate in the architecture, such as the page class 24, the configuration class 26, and the DCProperties class 20. For instance, the DCProperties 20 class includes methods that determine information needed to communicate with the target device 6a, 6b . . . n, such as access path, user name, type, etc, and the getProperty( ) method in the page class 24 that queries the device for property value information. In this way, with the described implementations, the vendor coding burdens are limited because the vendor need only implement device specific methods for a few classes using device specific APIs. The vendor may use common methods for those device independent methods in the DCProperties 20, DevComm 22, and page 24 classes, such that the vendor implementations implement the device specific APIs 14a, 14b . . . 14n.

Figure 4:
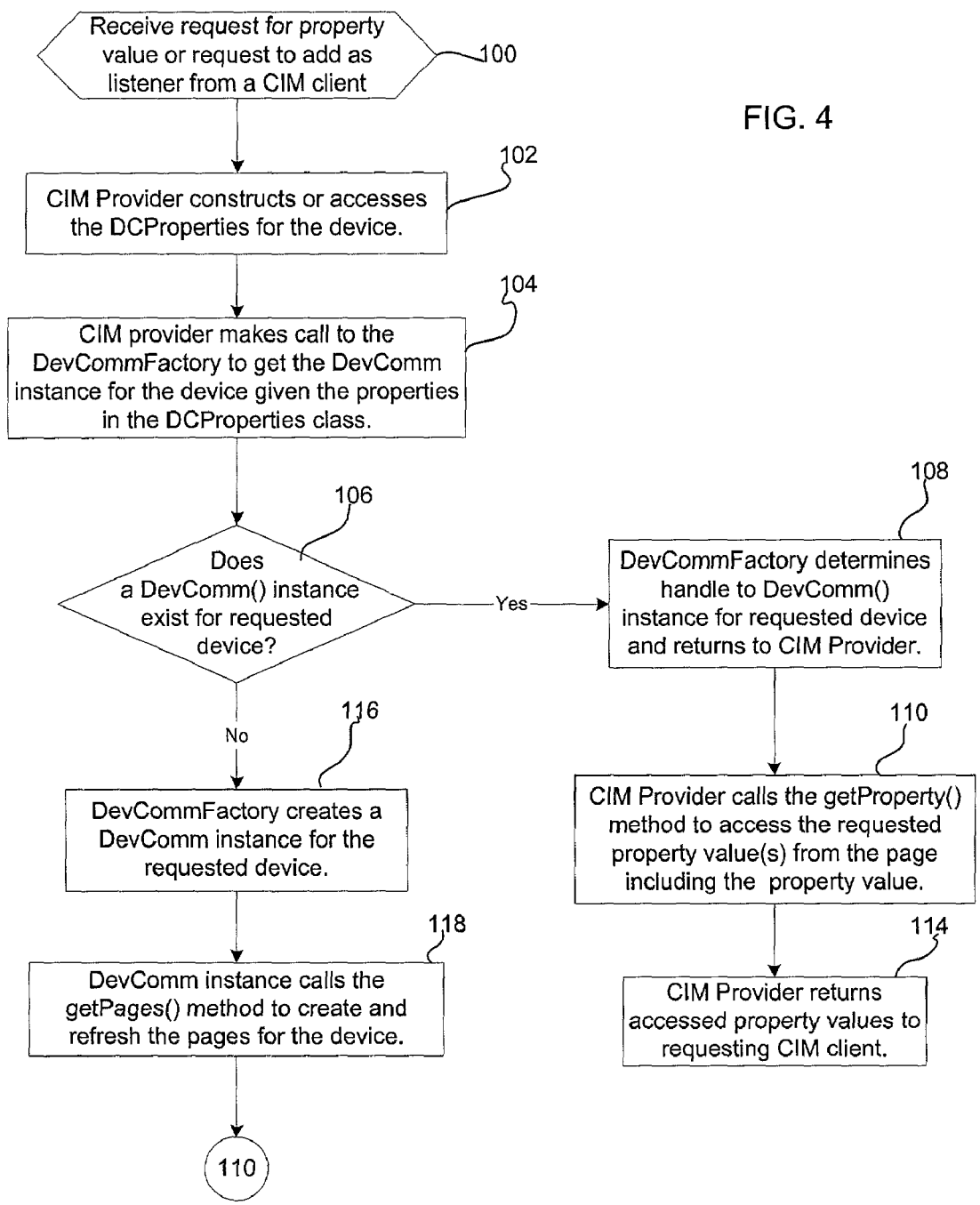
FIGS. 4 and 5 illustrate logic to provide information on device properties for different devices in accordance with implementations of the invention.
Figure 5:
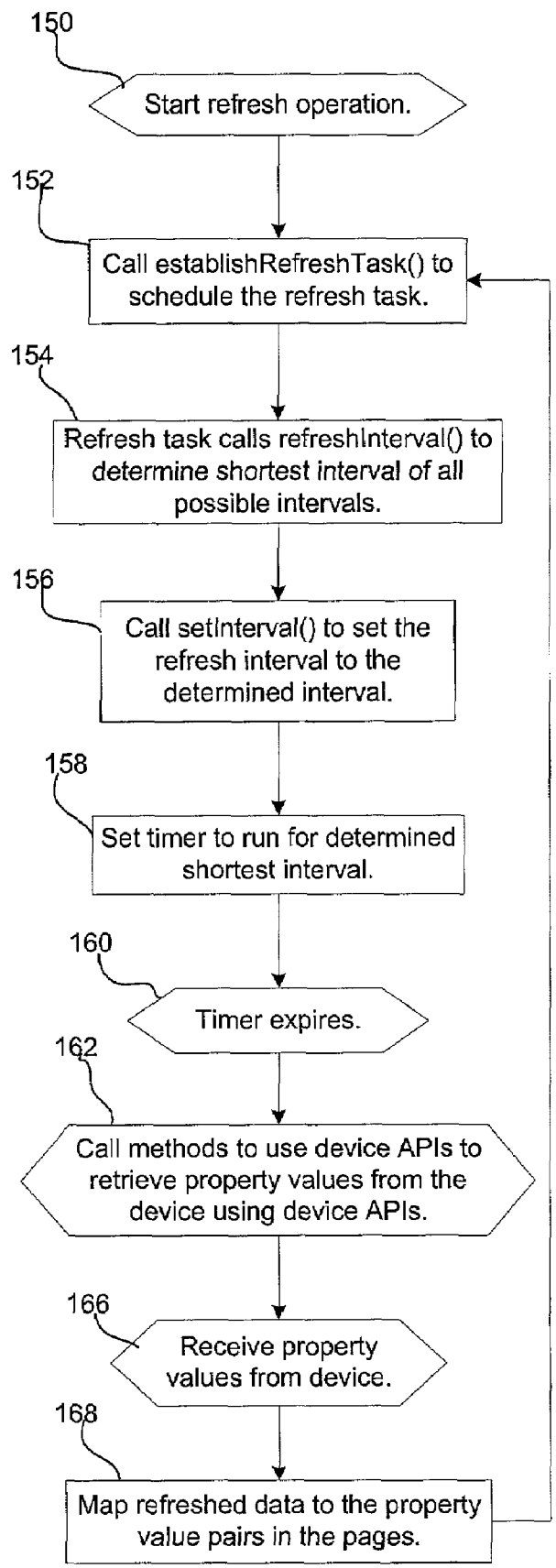

FIGS. 4 and 5 illustrate logic implemented in the CIM providers 10a, 10b . . . 10n and DevComm Factory 54 to call the DevComm( ) instance 42 and other methods implemented in the device specific module classes 12a, 12b . . . 12n to access information on the devices 6a, 6b . . . 6n to make available to requesting CIM clients 4a, 4b. FIG. 4 illustrates logic to respond to a CIM client 4a, 4b request for CIM instances from one target device 6a, 6b . . . n. Control begins at block 100 with the CIM provider 10a, 10b . . . 10n receiving a request for property values for a device or to add a client user as a listener to be notified of event changes. In certain implementation, the client 10a, 10b . . . n receives a client request from the CIMOM 2, which routes the client request to the appropriate CIM provider 10a, 10b . . . 10n. The CIM Provider 10a, 10b . . . 10n then calls (at block 102) methods fo the DCProperties class 20 to either access an already existing DCProperties object 50 for the target device or constructs a DCProperties object 50, which is provided to the DevComm object 52 to maintain. The CIM provider 10a, 10b . . . 10n then calls (at block 104) the DevComm Factory instance 54 with information from the DCProperties instance 50 to obtain a handle to the DevComm instance 52 given the properties in the DCProperties instance 50.

If (at block 106) there is a DevComm( ) instance 32a, 32b . . . 32n for the target device 6a, 6b . . . 6n, then the DevComm Factory instance 54 determines (at block 108) the handle to the DevComm( ) instance for the requested device and returns the handle to the calling CIM Provider 10a, 10b . . . 10n. After receiving the handle to the Dev-Comm( ) instance 32a, 32b . . . 32n to use, the CIM Provider 10a, 10b . . . 10n calls (at block 110) the getProperty( ) method to access the requested property value(s) from the page 42a, 42b . . . 42n including the requested property value 44a . . . 44n. The accessed property value is returned (at block 114) to the requesting CIM client 4a, 4b.

If (at block 106) there is no active DevComm( ) class instantiated for the targeted device 6a, 6b . . . 6n, then the DevComm Factory instance 54 creates (at block 116) a DevComm( ) instance for the requested device. The Dev-Comm instance 52 then calls (at block 118) the getPages( ) method from the page class 26 to create pages to include property values for the device and refresh the pages. From block 118, control proceeds to block 110 to access the requested data from the page 42a, 42b . . . 42.

FIG. 5 illustrates logic implemented in the DevComm instance 52 to utilize the methods of the page 24 class to refresh the pages 42a, 42b . . . 42n. Control begins at block 150 upon receiving a call to the activate( ) method or the invalidateAllData( ) methods in the DevComm( ) instance 52 for the device 6a, 6b . . . 6n from which to access data. In response, the DevComm instance 52 calls (at block 152) the establishRefreshTask( ) method to schedule a refresh operation. The refresh task then calls (at block 154) the refreshInterval( ) method to determine the shortest interval of all possible intervals, where possible intervals include the defaultinterval as well as any intervals for the page provided by processes performing the logic of FIG. 4. The refresh task then calls (at block 156) the setInterval( ) method to set (at block 156) the refresh interval to the determined shortest interval and sets (at block 158) a timer to run for the determined shortest interval. When the timer expires (at block 160), the refresh task process then calls methods to use device specific APIs 14a, 14b to query the target device 6a, 6b . . . 6n for the property values. Upon receiving (at block 166) the property values 44a . . . 44n from the device 6a, 6b . . . 6n, the refresh task then maps (at block 168) the refreshed data to property values 44a . . . 44n in the pages 42a, 42b . . . 42n.

The described implementations allow a device vendor to participate in the WBEM framework and only have to code a limited number of methods of a DevComm class 22 that provides an interface to device specific APIs to perform device specific operations. The DevComm( ) class may be used by CIM providers to access device specific operations and obtain device specific information. The remainder of the methods that are used to provide clients information on the devices are standard across all devices, i.e., device independent. In this way, the vendor coding burdens are limited to coding a few methods to provide property value information to pages. Further, the device specific data is maintained on pages that are accessed using device independent methods to provide a common interface to such device specific information buffered on the pages. The vendor need only provide device specific code for methods that query the device for property value information to add to the buffered pages.

In further implementations, the DevComm classes described herein may be implemented in a proxy provider, which is a CIM provider implementation external to the device being managed. The CIMOM may use proxy providers to maintain access to numerous managed elements. Further, the proxy providers or CIM Providers that implement the DevComm classes behave similarly across devices because the DevComm classes provide a uniform view of device properties to the providers. With DevComm, the control operations are specific, but the data queries and property change subscriptions are uniform across devices.

Further, the described implementations protect managed devices from being overloaded with information requests from CIM clients because the access requests to the managed devices are consistently made to update the properties in the pages maintained for the device. Because the CIM client requests are satisfied from the pages and not going to the device directly, the CIM client requests per se do not place any burden on the managed devices. Instead, the requests made directly to the device are limited to the page refresh operations, which occur at regular intervals and place only limited burdens on the device.

Using Page Buffers for Device Property Values

Figure 6:
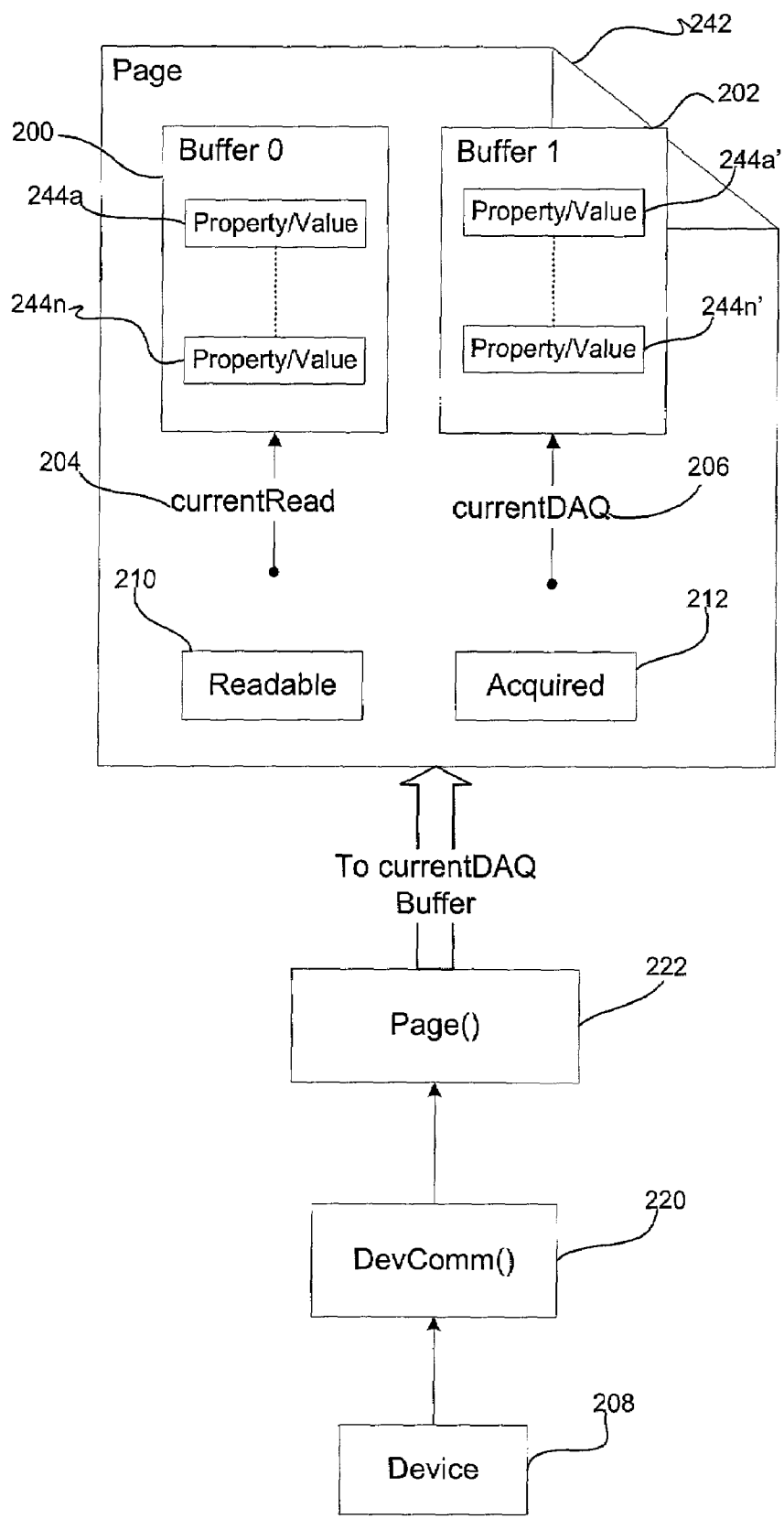
FIG. 6 illustrates an arrangement of a page including buffers in accordance with implementations of the invention.

In certain above described implementations, property/value pairs 44a . . . 44n are grouped in pages 42a, 42b . . . 42n as shown in FIG. 3. FIG. 6 illustrates an implementation of a page 242, such as one of pages 42a, 42b . . . 42n in FIG.

2, including two buffers 200 and 202, one denoted as buffer 0 and the other as buffer 1. Each buffer 200 and 202 may be implemented as a hash table. Each buffer 200 and 202 maintains fields for the same property/value pairs 244a . . . 244n and 244a' . . . 244n'. For each page 242, a currentRead pointer 204 points to the buffer 200 or 202 which is currently being used to service requests for property/value information from CIM providers 10a, 10b . . . 10n. A currentDAQ pointer 206 points to the buffer 200 or 202 which receives refreshed data from a monitored device 208. A readable variable 210 indicates which buffer 0 (200) or 1 (202) is being used to service read requests from CIM clients 4a, 4b (FIG. 1) and a acquired variable 212 indicates which buffer 200 or 202 is being used to buffer new property/value information provided directly from the monitored device 208.

FIG. 6 illustrates a DevComm class instance 220, such as instance 52 shown in FIG. 3, that directly accesses property data from the devices, using such methods as getProperty, refresh, scheduling methods, etc. The page class 24, includes the methods to perform the read and write operations with respect to the read buffer for the page 242 and map data accessed from the monitored device 208 to the corresponding property/value fields in the buffer addressed by the currentDAQ pointer 206, which in the example of FIG. 5 comprises buffer 1 (202). The page class 24 methods when performing the refresh may further prevent other processes from accessing a page involved in a refresh operation until the refresh operation has completed. Further, if a method from the configuration class 26 is updating device 6a, 6b . . . 6n configurations, then the methods of the page class 24 would delay performing a periodic refresh operation until the property/value 44a . . . 44n is updated with the new configuration value. Upon the refresh, the page class 24 methods would apply the new configuration value entered into the pages 42a, 42b . . . 42n to the device 6a, 6b . . . 6n using the device specific APIs 14a, 14b.

Figure 7:
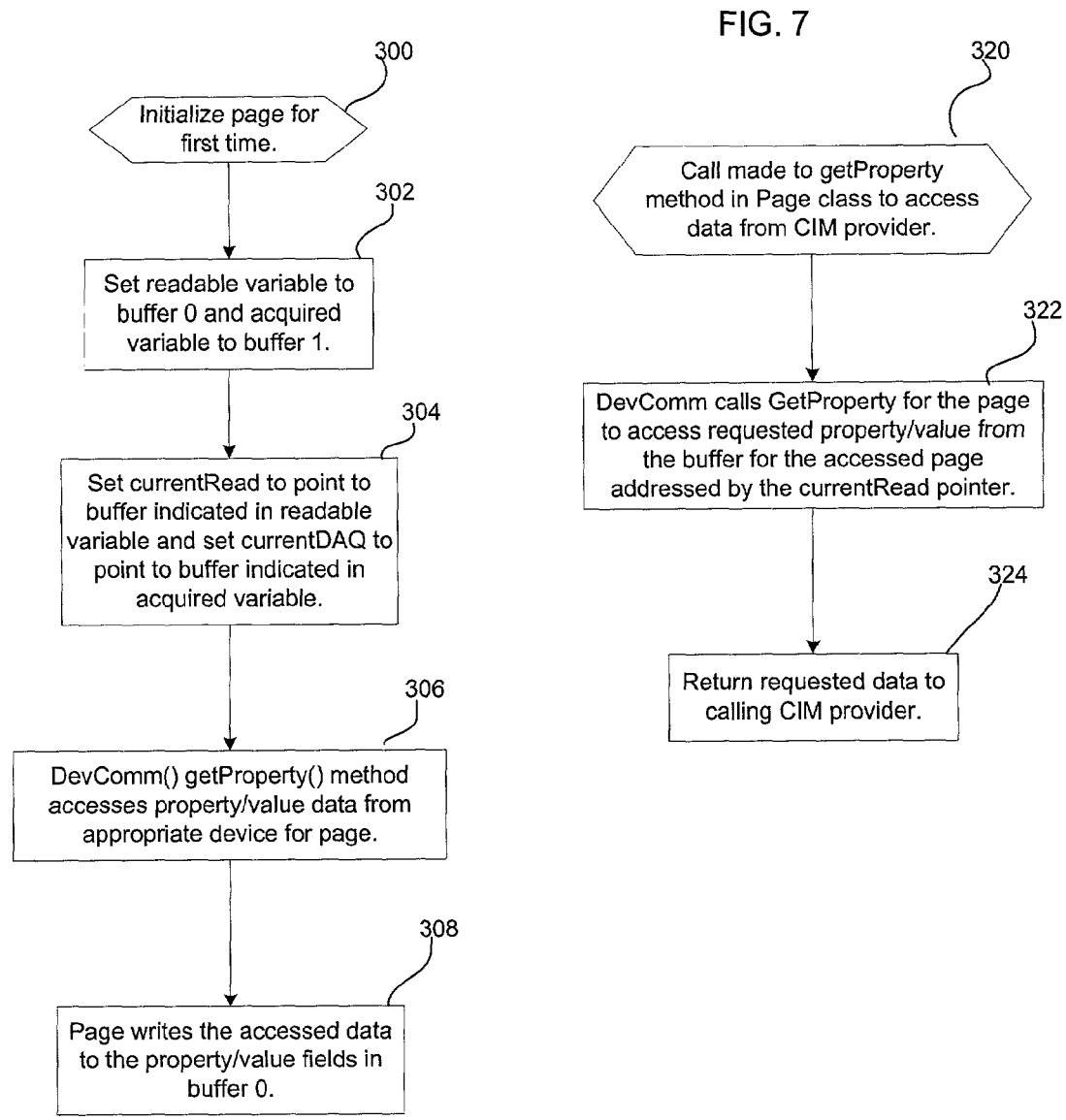
FIGS. 7 and 8 illustrate logic to provide access to property value information maintained in page buffers in accordance with implementations of the invention.

FIG. 7 illustrates logic implemented in the DevComm 220 and Page 222 class methods to initialize the buffers 200 and 202 for a page 242 and return requested property data from the currentRead buffer 204. Control begins at block 300 with a page 242 being initialized, which may entail a call to the createPages( ) method of the DevComm( ) 220 instance to create a page of property values for a specific device. After the page 242 is created, a call would be made to methods in the page class 222 to set (at block 302) the readable variable 210 to a default buffer 200 or 202 and the acquired variable 212 to the other buffer. In the exemplary logic of FIG. 7, the readable variable 210 is set to buffer 0 (200) and the acquired variable 212 is set to buffer 1 (202). The currentRead pointer 204 is then set (at block 304) to indicate the buffer identified in the readable variable 210 and the currentDAQ 206 pointer is set to the buffer identified in the acquired variable 212. The DevComm( ) 220 getproperty method is then called to access (at block 306) the data from the device 208 utilizing the device specific APIs. Another DevComm( ) 220 method is called to write (at block 308) the accessed data to the appropriate property/value field 244a' . . . 244n' in the buffer addressed by the currentDAQ 206 pointer, which is shown as buffer 1 (202) in FIG. 5. The method called to write the data may comprise a setProperty( ) method from the DevComm( ) class 220 that is provided a property name and value parameters. Execution of the setProperty( ) method sets the property value 244a' . . . 244n' in a page 242 to the parameter included in the call. In this way, the mapping of property values accessed from the device to specific fields within a buffer are implemented in the setProperty( ) method of DevComm 220, which implements the mapping. At this point, device specific data may be accessed from the read buffer, addressed by the current Read pointer 204 using the page access methods of the Page class 222. If the page 242 was initiated in response to a request for a property/value, then the requested data would be returned to the client originating the request through the appropriate CIM provider.

At block 320, a call is made to a getProperty or getProperties( ) method in the Page( ) class 222 from a CIM provider to access property values for a device. The Page class 222 getProperty method is executed to access (at block 322) the requested property from the buffer 200 or 202 addressed by the currentRead pointer 204 and return (at block 324) the requested property value(s) to the calling CIM provider, which in turn forwards the data to the requesting client.

Figure 8:
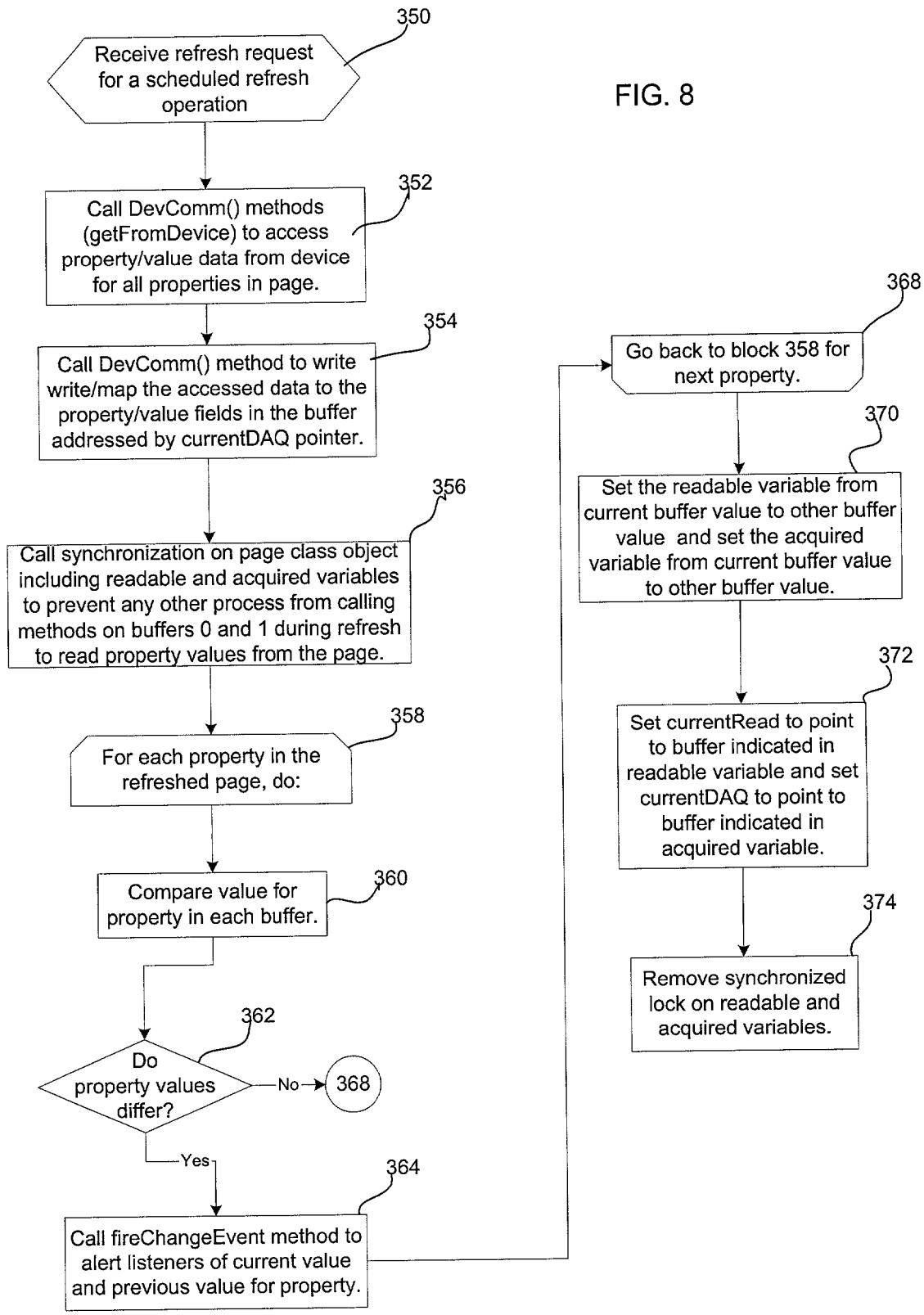

FIG. 8 illustrates logic implemented in the DevComm 220 and Page 222 class instances for the device 208 to refresh a page. Control begins at block 350 with a call to a refresh request to perform a scheduled or forced refresh operation, such as a scheduleRefresh method in the Page class 222. The DevComm 220 method getFromDevice( ) is called (at block 352) to access from the device 208 all the property values 244a . . . 244n for the page 242. The DevComm 220 setProperty method is then called (at block 354) to set the property fields in the buffer 200 or 202 addressed by the currentDAQ pointer 206 with the corresponding values accessed from the device 208. A Java synchronized method is then called (at block 356) on objects from the Page class to lock the currentRead buffer 204 and DAQ buffer in order to prevent any process from accessing the buffers during the refresh operation. In alternative implementations, alternative techniques other than the Java synchronized method may be used to lock the read and acquired buffers to prevent any access.

For each property in the page 242, a loop is performed at blocks 358 to 368. At block 360, methods of the Page class 222, such as the diff( ) method discussed above, are called (at block 360) to compare each property value in the refreshed buffer, addressed by the currentDAQ pointer 206, and the previous property value, addressed by the currentRead pointer 204. If (at block 362) the values differ, then a fireChangeEvent( ) method in the DevComm class 220 is called (at block 364) to propagate to registered listeners, as indicated in the listener/property list 60 (FIG. 2), the refreshed and current property values that do not match. Control returns to block 368 to process the next property value in the page 242. After comparing all the property values 244a . . . 244n in the buffer 200 or 202 addressed by the currentDAQ pointer 206, methods from the Page class 222 are called to set (at block 370) the readable variable 210 from the current buffer identifier to the identifier of the other buffer and set the acquired variable 212 from the current buffer value to the value of the other buffer, i.e., switch the buffers that the currentRead 204 and currentDAQ 206 pointers reference. The currentRead pointer 204 is then set (at block 372) to address the buffer 200 or 202 identified in the updated readable variable 210 and the currentDAQ pointer 206 is set to address the buffer 200 or 202 identified in the updated acquired variable 212. The synchronized lock on the page methods is then removed (at block 374) to allow requesting CIM Providers to call Page class 220 methods to access device property values 244a . . . 244n from the read buffer 200 or 202 addressed by the currentRead pointer 204.

The described implementations thus provide techniques for implementing a page of property values accessed from the device. With the described implementations, requestors may access device property information from the page without having to burden the actual device with the requests. Further, the described implementations allow for refreshing of the device property values and still allow concurrent access to the property values. This is accomplished through the use of a double buffer, where each buffer includes fields for every property value for the page, and wherein one buffer is available for read access and the other for updating with newly accessed device data. With this arrangement, the access to the data from the read buffer is permitted while the other buffer is being refreshed with new device data. Further, the switch to make the buffer with the current downloaded data the read buffer is accomplished seamlessly by merely switching the buffer the pointers address to indicate which buffer to use as the read access buffer and which one to use as the update buffer. In this way, in certain implementations, access delays may be limited to the time required to switch the buffers the pointers address.

Additional Implementation Details

The above described method, apparatus or article of manufacture for providing access to information on device properties using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The above described implementations were described with respect to the CIM architecture to allow CIM clients access to device specific information. The described implementations may be applied to component architectures other than CIM, where an interchange protocol is provided to enable clients to access information from different vendor devices.

In the described implementations, the property value information for the devices was maintained in pages in the memory buffer 42. The term "page" as used herein refers to any addressable data structure or region of memory that stores property values for one device.

In the described implementations, each page includes property values for one device. In additional implementations, each page may include property values for different devices.

In the described implementation one read buffer and refresh buffer were provided for each page of property values. Alternatively, one or more read buffers and one or more refresh buffers may be provided for each page. Further, each page may have a different number of read and refresh buffers, as opposed to an equal number of read and refresh buffers as shown in FIG. 6.

The above described implementations organized the program code into an object oriented class structure. In alternative implementations, the program operations described herein may be implemented in methods in class architectures other than those described herein. Further, the program operations may be implemented in non-object oriented programming code.

The logic of FIGS. 4, 5, 7, and 8 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel. Yet further, the described operations may be performed by a single processing unit or by distributed processing units.

Figure 9:
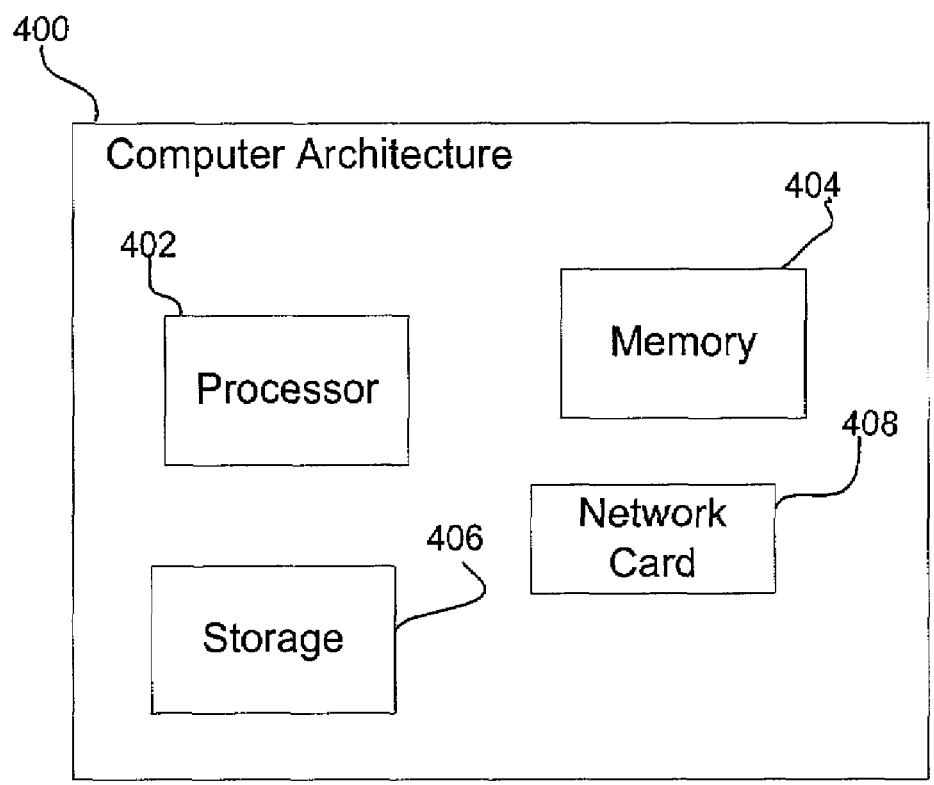
FIG. 9 illustrates an example of a computing architecture in which aspects of the inventions may be implemented.

FIG. 9 illustrates one implementation of the architecture of the computer systems in which the described components, such as the DevComm Factory, DevComm, CIM Provider, he server 2 and clients 4a and 4b. These systems may implement a computer architecture 400 having a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes a network card 408 to enable communication with a network. The program components described in FIGS. 1–8 may be implemented in a single computer system or in distributed computer systems that communicate using a distributed computing protocol, such as Jini, Remote Method Invocation (RMI), etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for accessing information on a plurality of different devices in a network, comprising:

receiving a request by a provider for device property information of a first device;

calling a method of a factory class in response to the request, wherein the factory class manages a device program for each of the different devices;

instantiating, by the called factory class method, a first device program for the first device, wherein the first device program includes device program methods that are common in each of the device programs for the different devices;

calling, by the first device program, methods in a page program to access the device property information, wherein the methods in the page program include device specific commands to query the first device for the device property information;

executing statements in the first device program to query the first device for the first device property information;

updating a first page in a computer-readable medium with the first device property information in response to the query, wherein the computer-readable medium includes a set of pages that each include device property information for each of the different devices that are selectively accessible based on queries using specific commands in a respective device program for a respective different device; and returning, by the provider, the first device property information.

2. The method of claim 1, wherein each page maintains property values for only one device.

3. The method of claim 1, further comprising:
invoking a process to refresh a selected page at a time interval, wherein the selected page includes device property information for an associated device; and
setting a timer for the time interval;
executing statements to query the associated device after the time expires; and
refreshing the selected page with updated device property information in response to the query for the associated device.

4. The method of claim 1, wherein each device program includes device specific commands to obtain information to access the device in a network, wherein the information to access the device is used by statements that are executed to query the device over the network.

5. The method of claim 1, further including a properties class for each device including device specific commands to obtain information needed to access the device over a network, and wherein the page program comprises a page class of methods to access information from the device.

6. The method of claim 5, wherein an instance of the properties class and page class are instantiated for each device for which device property information is maintained in the pages.

7. The method of claim 1, wherein the device programs are utilized within a Common Information Model (CIM) environment to provide information to CIM clients.

8. The method of claim 1, wherein the different devices are from different vendors.

9. The method of claim 8, wherein the different devices include devices of a same device type.

10. The method of claim 1, wherein the devices are device types comprising storage systems, application programs, operating systems, and computers.

11. The method of claim 1, wherein the method of the factory class is configured to instantiate the device program for each of the devices.

12. The method of claim 1, wherein the factory class method constructs an instance of a device class in response to the request.

13. The method of claim 1, further comprising:
returning, to the provider, a handle-to the first device program; and
calling, with the provider, the first device program for which the handle was returned to access the first device property information from the first page.

14. A method for enabling access to information from a device, comprising:
receiving a request for device property information for a device;

generating a device program to access the device property information from the device, wherein the device program includes device specific commands to query the device for the device property information and device independent statements common to device programs for other devices to buffer the queried device property information to return to requesting clients;

accessing, by the device program, in response to the request, a device page that maintains the device property information for the device;

concurrently refreshing the device property information in the device page and retrieving the device property information stored in the device page for submission to the requesting client; and providing the device property information based on the request.

15. The method of claim 14, wherein concurrently refreshing and retrieving the device property information includes:

refreshing a first buffer in the device page with updated device property information for the, device; and reading from a second buffer in the device page previously stored device property information for the device, wherein the first and second buffers may each be dynamically configured to act as a refresh or read buffer based on designated pointers included in the device page.

16. A system for accessing information on a plurality of different devices in a network, comprising:
a computer readable medium;
means for receiving a request by a provider for device property information of a first device;
means for calling a method of a factory class in response to the request, wherein the factory class manages a device program for each of the different devices;
means for instantiating a first device program for the first device, wherein the first device program includes device program methods that are common in each of the device programs for the different devices;
means for calling by the first device program, methods in a page program to access the device property information, wherein the methods in the page program include device specific commands to query the first device for the device property information;
executing statements in the first device program to query the first device for the first device property information;
means for updating a first page in the computer-readable medium with the first device property information in response to the query, wherein the computer-readable medium includes a set of pages that each include device property information for each of the different devices that are selectively accessible based on queries using specific commands in a respective device program for a respective different device; and returning, by the provider, the first device property information.

17. The system of claim 16, further comprising:
means for invoking a process to refresh a selected page at a time interval, wherein the selected page includes device property information for an associated device; and
means for setting a timer for the time interval;
means for executing statements to query the associated device after the time expires; and
means for refreshing the selected page with updated device property information in response to the query for the associated device.

18. The system of claim 17, further including a properties class for each device including device specific commands to obtain information needed to access the device over a network, and wherein the page program comprises a page class of methods to access information from the device.

19. The system of claim 18, further comprising:
means for instantiating an instance of the properties class and page class for each device for which device property information is maintained in the pages.

20. The system of claim 16, wherein the different devices are from different vendors.

21. A system for enabling access to information from a device, comprising:
a computer readable medium;
means for receiving a request for device property information for a device;
means for generating a device program to access the device property information from the device, wherein the device program includes device specific commands to query the device for the device property information and device independent statements common to device programs for other devices to buffer the queried device property information to return to requesting clients;
means for accessing by the device program, in response to the request, a device page that maintains the device property information for the device;
means for concurrently refreshing the device property information in the device page and retrieving the device property information stored in the device page for submission to the requesting client; and
providing the device property information based on the request.

22. The system of claim 21, wherein concurrently refreshing and retrieving the device property information includes:
refreshing a first buffer in the device page with updated device property information for the device; and
reading from a second buffer in the device page previously stored device property information for the device,
wherein the first and second buffers may each be dynamically configured to act as a refresh or read buffer based on designated pointers included in the device page.

23. A system for accessing information on a plurality of different devices in a network, comprising:
a computer readable medium;
at least one processor capable of executing code to perform operations, the operations comprising:
(i) receiving a request by a provider for device property information of a first device;
(ii) calling a method of a factory class in response to the request, wherein the factory class manages a device program for each of the different devices;
(iii) instantiating, by the called factory class method, a first device program for the first device, wherein the first device program includes device program methods that are common in each of the device programs for the different devices;
(iv) calling, by the first device program, methods in a page program to access the device property information, wherein the methods in the page program include device specific commands to query the first device for the device property information;
(v) executing statements in the first device program to query the first device for the first device property information;
(vi) updating a first page in a computer-readable medium with the first device property information in response to the query, wherein the computer-readable medium includes a set of pages that each include device property information for each of the different devices that are selectively accessible based on queries using specific commands in a respective device program for a respective different device; and
returning, by the provider, the first device property information.

24. The system of claim 23, wherein the operations performed by the at least one processor further comprise:
invoking a process to refresh a selected page at a time interval, wherein the selected page includes device property information for an associated device; and
setting a timer for the time interval; and
executing statements to query the associated device after the time expires; and
refreshing the selected page with updated device property information in response to the query for the associated device.

25. The system of claim 23, further including a properties class for each device including device specific commands that when executed by the at least one processor obtain information needed to access the device over a network, and wherein the page program comprises a page class of methods that when executed by the at least one processor access information from the device.

26. The system of claim 23, wherein the different devices are from different vendors.

27. An article of manufacture for accessing information on a plurality of different devices in a network, wherein the article of manufacture causes operations to be performed, the operations comprising:
receiving a request by a provider for device property information of a first device;
calling a method of a factory class in response to the request, wherein the factory class manages a device program for each of the different devices;
instantiating, by the called factory class method, a first device program for the first device, wherein the first device program includes device program methods that are common in each of the device programs for the different devices;
calling, by the first device program, methods in a page program to access the device property information, wherein the methods in the page program include device specific commands to query the first device for the device property information;
executing statements in the first device program to query the first device for the first device property information;
updating a first page in a computer-readable medium with the first device property information in response to the query, wherein the computer-readable medium includes a set of pages that each include device property information for each of the different devices that are selectively accessible based on queries using specific commands in a respective device program for a respective different device; and
returning, by the provider, the first device property information.

28. The article of manufacture of claim 27, wherein each page maintains property values for only one device.

29. The article of manufacture of claim 27, further comprising:
invoking a process to refresh a selected page at a time interval, wherein the selected page includes device property information for an associated device; and
setting a timer for the time interval; and
executing statements to query the associated device after the time expires; and refreshing the selected page with updated device property information in response to the query for the associated device.

30. The article of manufacture of claim 27, wherein each device program includes device specific commands to obtain information to access the device in a network, wherein the information to access the device is used by the statements that are executed to query the device over the network.

31. The article of manufacture of claim 27, further including a properties class for each device including device specific commands to obtain information needed to access the device over a network, and wherein the page program comprises a page class of methods to access information from the device.

32. The article of manufacture of claim 31, wherein an instance of the properties class and page class are instantiated for each device for which property information is maintained in the pages.

33. The article of manufacture of claim 27, wherein the device programs are utilized within a Common Information Model (CIM) environment to provide information to CIM clients.

34. The article of manufacture of claim 27, wherein the different devices are from different vendors.

35. The article of manufacture of claim 34, wherein the different devices include devices of a same device type.

36. The article of manufacture of claim 27, wherein the devices are device types comprising storage systems, application programs, operating systems, and computers.

37. The article of manufacture of claim 27, further comprising:
wherein the method of the factory class is configured to instantiate the device program for each of the devices.

38. The article of manufacture of claim 37, wherein the factory class method constructs an instance of a device class in response to the request from the provider.

39. The article of manufacture of claim 38, further comprising:
returning, to the provider, a handle to the first device program; and
calling, with the provider, the first device program for which the handle was returned to access the first device property information from the first page.

40. An article of manufacture for enabling access to information from a device, wherein the article of manufacture causes operations to be performed, the operations comprising:
receiving a request for device property information for a device;
generating a device program to access the device property information from the device, wherein the device program includes device specific commands to query the device for the device property information and device independent statements common to device programs for other devices to buffer the queried device property information to return to requesting clients;
accessing by the device program, in response to the request, a device page that maintains the device property information for the device;
concurrently refreshing the device property information in the device page and retrieving the device property information stored in the device page for submission to the requesting client; and
providing the device property information based on the request.

41. The article of manufacture of claim 40, wherein concurrently refreshing and retrieving the device property information includes:
refreshing a first buffer in the device page with updated device property information for the device; and
reading from a second buffer in the device page previously stored device property information for the device,
wherein the first and second buffers may each be dynamically configured to act as a refresh or read buffer based on designated pointers included in the device page.

42. A system for providing device information for different devices in a computer network, comprising:
a provider configured to generate a request for device property information for a first device included in the different devices; and
a memory device storing a device page including a first device page including the device property information, the device page including:
a first and second buffer, each buffer including corresponding fields storing the same device property information for the first device,
a first point identifying either the first or second buffer as a buffer used to service the request from the provider, and
a second pointer identifying either the first or second buffer as a buffer for receiving refreshed device property information from the first device,
wherein the provider, in response to the request, calls methods of a device communication properties class to query a device communication factory class to access a device communication object associated with the first device, wherein the device communication object calls methods of a page class for obtaining the device property information from the device page.

* * * * *

UNITED STATES PATENT AND TRADEMARK OFFICE
CERTIFICATE OF CORRECTION

| | |
|---|---|
| PATENT NO. | : 7,111,304 B2 |
| APPLICATION NO. | : 10/153484 |
| DATED | : September 19, 2006 |
| INVENTOR(S) | : Steven G. Hand et al. |

It is certified that error appears in the above-identified patent and that said Letters Patent is hereby corrected as shown below:

Column 15, line 59, "handle-to" should read --handle to--.

Column 16, line 21, "the, device;" should read --the device;--.

Column 16, line 66, "claim 17," should read --claim 16,--.

Signed and Sealed this

Twelfth Day of December, 2006

JON W. DUDAS
*Director of the United States Patent and Trademark Office*